Sept. 28, 1937.  F. ZOOK  2,094,228
FASTENER
Filed Jan. 13, 1937   2 Sheets-Sheet 1

Inventor
Frank Zook
By Clarence A. O'Brien
Hyman Berman
Attorneys

Sept. 28, 1937.  F. ZOOK  2,094,228
FASTENER
Filed Jan. 13, 1937    2 Sheets-Sheet 2
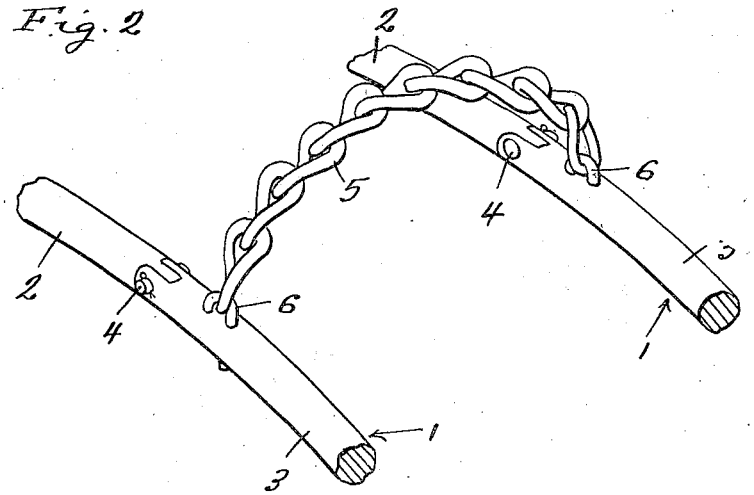
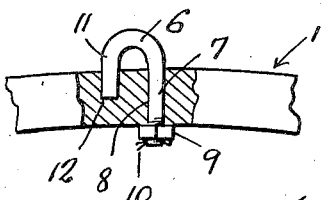
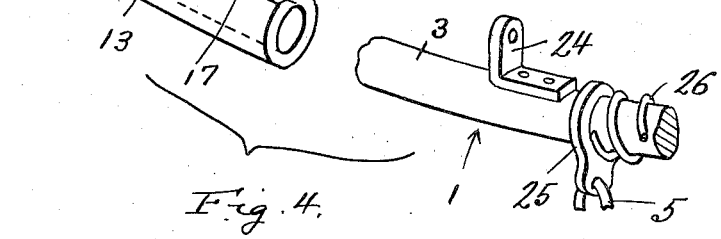
Inventor
Frank Zook
By Clarence A. O'Brien
Hyman Berman
Attorneys Patented Sept. 28, 1937

2,094,228

UNITED STATES PATENT OFFICE 2,094,228

FASTENER

Frank Zook, Homestead, Pa.

Application January 13, 1937, Serial No. 120,432

3 Claims. (Cl. 152—14)

The present invention relates to new and useful improvements in antiskid chains for vehicles and has for one of its important objects to provide, in a manner as hereinafter set forth, a device of this character which may be expeditiously mounted in position on a tire without the necessity of jacking the wheel up.

Another very important object of the invention is to provide an antiskid device of the aforementioned character comprising a pair of side rings including hingedly connected sections with cross chains extending between said rings, together with novel means for anchoring the ends of said cross chains to said rings.

Still another very important object of the invention is to provide an antiskid chain of the character described embodying novel means for detachably connecting the free ends of the ring sections together.

Other objects of the invention are to provide an antiskid chain for vehicles which will be comparatively simple in construction, quiet when in use, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts through the several views, and wherein:

Figure 2 is a perspective view of a portion of the invention, showing the hingedly connected ends of the side ring sections and one of the cross chains.

Figure 3 is a detail view principally in vertical longitudinal section, showing the mounting of one of the cross chain hooks in the side rings.

Figure 4 is a perspective view showing, separated, the means for detachably connecting the free ends of the side ring sections.

Figure 1:
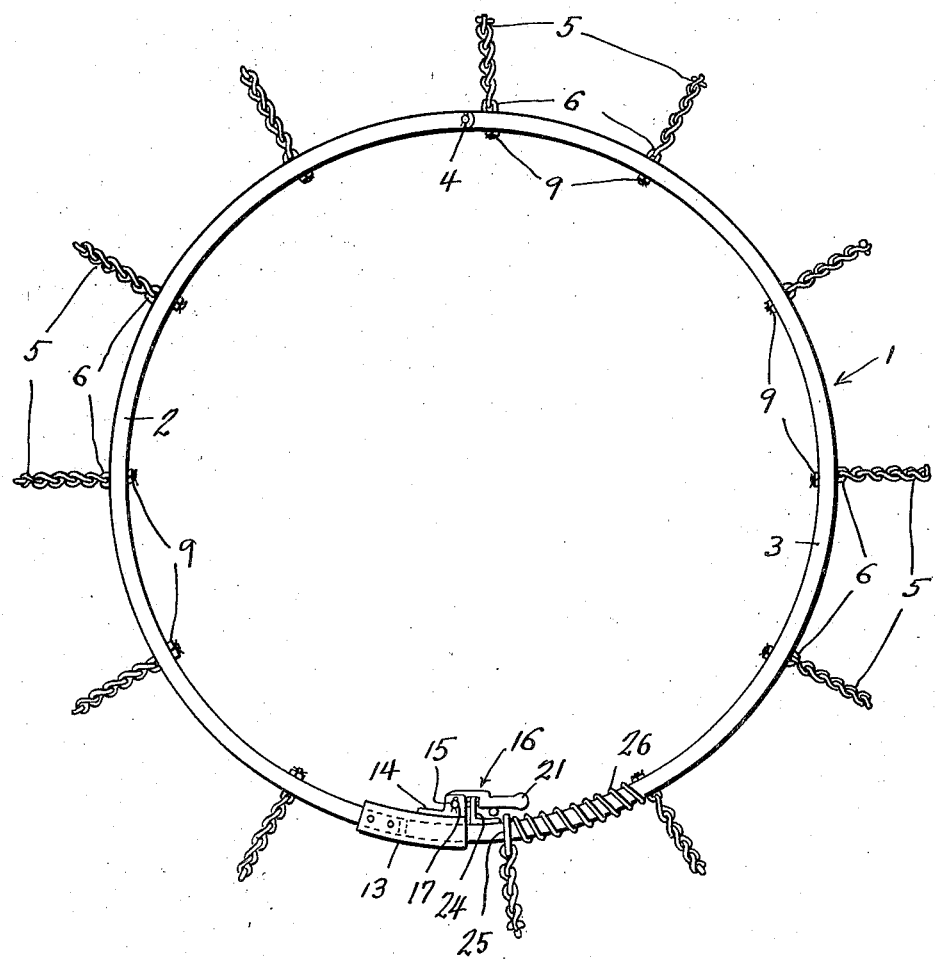
Figure 1 is a view in side elevation of an antiskid chain constructed in accordance with the present invention.

Referring now to the drawings in detail, it will be seen that the embodiment of the invention which has been illustrated comprises a pair of side rings of suitable metal which are designated generally by the reference numeral 1. Each side ring 1 includes complemental sections 2 and 3 which are hingedly connected at one end, as at 4.

Extending between the side rings 1 and anchored thereto at circumferentially spaced points are cross chains 5. The ends of the cross chains 5 are securely connected to the side rings 1 through the medium of hooks 6. As illustrated to advantage in Fig. 3 of the drawings, the hooks 6 comprise shanks 7 extending through openings 8 which are provided therefor in the side rings 1 and having threaded thereon retaining nuts 9. Cotter pins 10 are provided for preventing loss of the nuts 9. The bills 11 of the hooks 6 are engaged in sockets 12 which are provided therefor in the side rings 1.

Fixed on the free end portions of the side ring sections 2 and projecting therefrom are sleeves or sockets 13. Brackets 14 are fixed on the sleeves 13, said brackets including right angularly projecting bifurcations 15 between which snap hooks which are designated generally by the reference numeral 16 are journaled on pins 17. Each snap hook 16 includes an angular bar 18 having formed on one end an apertured ear 19 journaled on the pin 17. Projecting from the other end of the angular bar 18 is a tubular slotted housing 20 which terminates, at its free end, in a substantially ball shaped knob or handle 21. Slidably mounted in the tubular housing 20 is a spring pressed bolt 22 which is retracted through the medium of a button or the like 23 which is operable in the slot provided therefor in said tubular housing 20. The sleeves 13 are for the reception of the free end portions of the ring sections 3. Mounted on the free end portions of the ring sections 3 are apertured brackets 24 which receive the bolts 22 of the snap hooks 16 for detachably connecting the ring sections 2 and 3 together.

Rings 25 are slidably mounted on the free end portions of the sections 3 of the side rings 1 and connected to said rings 25 are the ends of one of the cross chains 5. Coil springs 26 encircle the sections 3 and are engaged with the rings 25 for yieldingly urging said rings toward the free ends of said sections 3. It will thus be seen that one of the cross chains 5 is slidably mounted on the side rings 1.

To mount the device on a tire the side rings 1 are opened and placed on said tire with the free ends of the sections 2 and 3 lowermost or next to the ground. The free end portions of the sections 3 are then engaged in the sleeves 13 and secured by the snap hooks 16. The slidably mounted cross chain 5 which is connected to the sections 3 by the rings 25 permits the sections 2 and 3 to be connected in this manner without interference from the ground, as would be the case were the cross chain at this point fixedly attached to the side rings. When the cross chains 5 become worn or broken they may be expeditiously replaced by simply removing the anchoring hooks 6. When not in use the ring sections 2 and 3 may be compactly folded in a manner to occupy a minimum of space in the luggage compartment of the automobile.

It is believed that the many advantages of an antiskid chain constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. An antiskid device for vehicles comprising a pair of side rings including complemental sections hingedly connected at one end, sleeves fixed on the free ends of one of the sections of each side ring and projecting therefrom for the reception of the free end portions of the other sections, bifurcated brackets fixed on the sleeves, apertured members fixed on the free end portions of said other sections and snap hooks journaled between the bifurcations of said brackets and engageable with said members for detachably securing the free ends of the sections together, said snap hooks including angular bars, apertured ears on one end of said bars journaled between the bifurcations, tubular housings projecting from the other ends of the bars, heads on the free ends of the tubular housings, and spring pressed bolts slidably mounted in said tubular housings.

2. An antiskid device comprising a pair of side rings including complemental sections hingedly connected at one end, cross chains extending between said side rings, means for detachably connecting the free ends of the side ring sections together, rings slidably mounted on the free end portions of certain of the sections, coil springs mounted on said certain sections and engaged with the last named rings for yieldingly urging same toward the free ends of said certain sections, and a cross chain connected at its ends to the last named rings.

3. Means for connecting together the ends of a side ring of an anti-skid device, comprising a sleeve fixed on one end and projecting therefrom for receiving the other end, a bracket fixed to the sleeve, a hook pivoted to the bracket, and a keeper member on said other end portion of the ring for the hook.

FRANK ZOOK.